United States Patent
Kurita et al.

(10) Patent No.: US 7,278,902 B1
(45) Date of Patent: Oct. 9, 2007

(54) ENABLING LOCATION SPECIFIC BURNISHING OF A DISK

(75) Inventors: Masayuki Kurita, Kanagawa-ken (JP);
Remmelt Pit, Cupertino, CA (US);
Shozo Saegusa, Ibaragi-ken (JP);
Toshiya Shiramatsu, Kanagawa-ken (JP); Mike Suk, San Jose, CA (US);
Hideaki Tanaka, Kanagawa-ken (JP)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 11/375,721

(22) Filed: Mar. 14, 2006

(51) Int. Cl.
*B24B 49/00* (2006.01)

(52) U.S. Cl. .................. 451/9; 451/10; 451/11; 451/41; 451/317; 360/122; 360/235.4; 73/105; 29/603.16; 29/90.01

(58) Field of Classification Search ............ 451/9, 451/10, 11, 41, 163, 317; 360/25, 75, 122, 360/234.3, 234, 235.4; 29/603.07, 603.16, 29/90.01; 73/105
See application file for complete search history.

(56) References Cited

U.S. PATENT DOCUMENTS

| | | | |
|---|---|---|---|
| 5,423,111 A | 6/1995 | Mori | |
| 5,696,643 A | 12/1997 | Tsuwako et al. | |
| 5,824,920 A | 10/1998 | Sugimoto et al. | |
| 5,991,113 A | 11/1999 | Meyer et al. | |
| 6,052,249 A * | 4/2000 | Abraham et al. | 360/59 |
| 6,073,486 A * | 6/2000 | Packard et al. | 73/105 |
| 6,262,572 B1 * | 7/2001 | Franco et al. | 324/212 |
| 6,309,283 B1 | 10/2001 | Liners et al. | |
| 6,311,551 B1 * | 11/2001 | Boutaghou | 73/105 |
| 6,419,551 B1 * | 7/2002 | Smith | 451/8 |
| 6,580,572 B1 * | 6/2003 | Yao et al. | 360/25 |
| 6,697,223 B2 * | 2/2004 | Lewis et al. | 360/235.7 |
| 2002/0039876 A1 * | 4/2002 | Ekstrum et al. | 451/41 |
| 2005/0185343 A1 * | 8/2005 | Agrawal et al. | 360/237 |
| 2006/0092570 A1 * | 5/2006 | Payne et al. | 360/236.5 |
| 2006/0218416 A1 * | 9/2006 | Gururangan et al. | 713/300 |

FOREIGN PATENT DOCUMENTS

| | | |
|---|---|---|
| JP | 56029843 | 3/1981 |
| JP | 58113869 | 7/1983 |
| JP | 62141632 | 6/1987 |
| JP | 1216769 | 8/1989 |
| JP | 1310860 | 12/1989 |
| JP | 1310861 | 12/1989 |
| JP | 3230320 | 10/1991 |

(Continued)

OTHER PUBLICATIONS

"Closed Loop Optimal Tandem Burnish/Glide Process With Variable Load" IBM Technical Disclosure Bulletin; Nov. 1988.

(Continued)

*Primary Examiner*—Eilleen P. Morgan

(57) ABSTRACT

Various embodiments of the present invention pertain to enabling location specific burnishing of a disk. According to one embodiment, the smoothness of a disk is evaluated by gliding over a disk to determine if there is an asperity on the disk. If there is an asperity on the disk, a location of the asperity is stored to enable location specific burnishing of the disk.

20 Claims, 13 Drawing Sheets

FOREIGN PATENT DOCUMENTS

JP    7057257    3/1995
JP    9063051    3/1997

OTHER PUBLICATIONS

"Magnetic Head with Piezoelectric Positioning" IBM Technical Disclosure Bulletin; Oct. 1973; p. 1429.

"One Step Burnish Mapping" IBM Technical Disclosure Bulletin; Jun. 1992.

"Intelligent Burnishing System Using a Cognizant Burnish Head" IBM Technical Disclosure Bulletin; Apr. 1987.

"Integrated Burnish and Glided head Instrumentation For Disk Process" Technical Disclosure Bulletin; Feb. 1979.

* cited by examiner

SIDE VIEW

SIDE VIEW

SIDE VIEW

Fly Height Adjuster 130C

Slider 200A

Burnisher 220A

Expansion 140C

FIG. 2A

ENABLING LOCATION SPECIFIC BURNISHING OF A DISK

RELATED APPLICATIONS

This Application is related to U.S. patent application, Ser. No. 11/252,511 by Kurita et al., filed on Oct. 18, 2005 and entitled "Method for Selectively Sensing and Removing Asperities from Hard Disk Drive Media Utilizing Active Thermally controlled Flying Heights", assigned to the assignee of the present invention and incorporated herein by reference as background material.

This Application is related to U.S. patent application, Ser. No. 11/253,102 by Kurita et al., filed on Oct. 18, 2005 and entitled "System and Apparatus for Selectively Sensing and Removing Asperities from Hard Disk Drive Media Utilizing Active Thermally controlled Flying Heights", assigned to the assignee of the present invention and incorporated herein by reference as background material.

TECHNICAL FIELD

Embodiments of the present invention relate to burnishing disks. More specifically, embodiments of the present invention relate to location specific burnishing of disks.

BACKGROUND

Disks are used for writing data to and for reading the data from. Disks are typically used in storage devices, such as hard disk drives (HDDs).

The disk needs to be smooth in order to write data to the disk and to read the data from the disk. Disks are burnished in order to achieve a smooth surface. In the conventional art, the entire surface of a disk is burnished. Then the smoothness of the surface of the disk is evaluated. If there are any asperities, e.g., protrusions, on the disk, the entire surface of the disk is burnished again. The disks are moved back and forth between a system that burnishes and a system that evaluates the smoothness of the surface of the disk until the disk's surface passes a specified level of smoothness.

SUMMARY OF THE INVENTION

Various embodiments of the present invention pertain to enabling location specific burnishing of a disk. According to one embodiment, the smoothness of a disk is evaluated by gliding over a disk to determine if there is an asperity on the disk. If there is an asperity on the disk, a location of the asperity is stored to enable location specific burnishing of the disk.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 2A and 2B depict sliders that have a fly height adjuster and a burnisher, according to various embodiments of the present invention.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

OVERVIEW

As already stated, with the conventional art the entire surface of disks are re-burnished if one or more asperities are found. Re-burnishing the entire surface of a disk increases the probability that the surface of the disk will be damaged. According to various embodiments of the present invention, location specific burnishing is performed. For example, the surface of a disk is evaluated for asperities. If an asperity is found, the location where the asperity is found is burnished. The areas of the disk which do not have asperities are not re-burnished.

Further with the conventional art, a disk is moved back and forth between a burnishing system and an evaluating system. However, according to various embodiments of the present invention, the disk does not need to be moved between systems, as will become more evident.

SLIDERS

Typically a hard disk drive (HDD) uses an actuator assembly for positioning read/write heads at the desired location of a disk to read data from and/or write data to a disk. The read/write heads can be mounted on what is known as a slider. Generally, a slider provides mechanical support for a read/write head and electrical connections between the head and the drive.

FIGS. 1A-1D depict sliders that enable location specific burnishing of a disk, according to various embodiments of the present invention. According to one embodiment, a glider and an asperity detector are associated with a slider.

A glider is made out of smooth material, as is well known in the art, that enables a slider to glide over a disk at what is commonly known as a fly height. An asperity detector, according to one embodiment, causes the position of an asperity to be stored. For example, the asperity detector detects mechanical stress when a slider comes into contact with an asperity as the slider glides over the disk. The mechanical stress causes the asperity detector to generate an electrical signal. The electrical signal can be used to determine the location of the asperity that caused the mechanical stress.

Figure 1A:
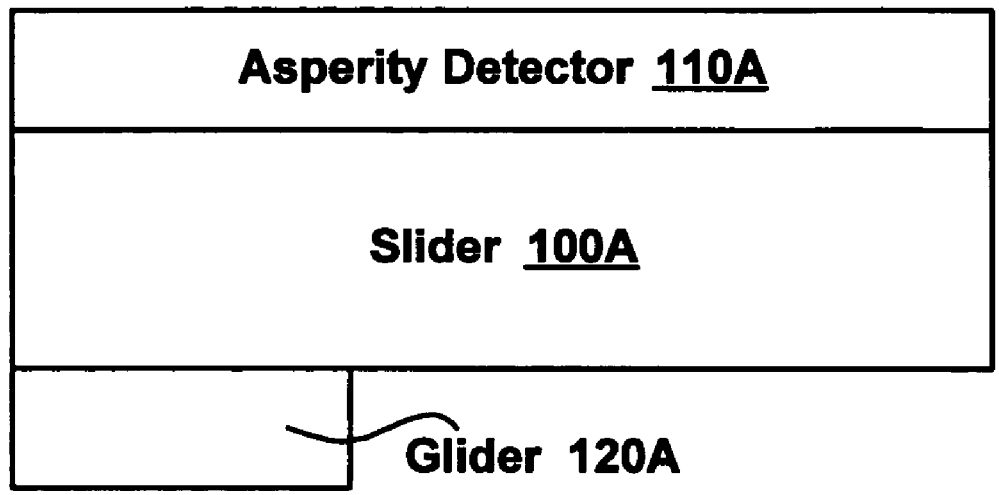
FIGS. 1A-1D depict sliders that enable location specific burnishing of a disk, according to various embodiments of the present invention.
Figure 1B:
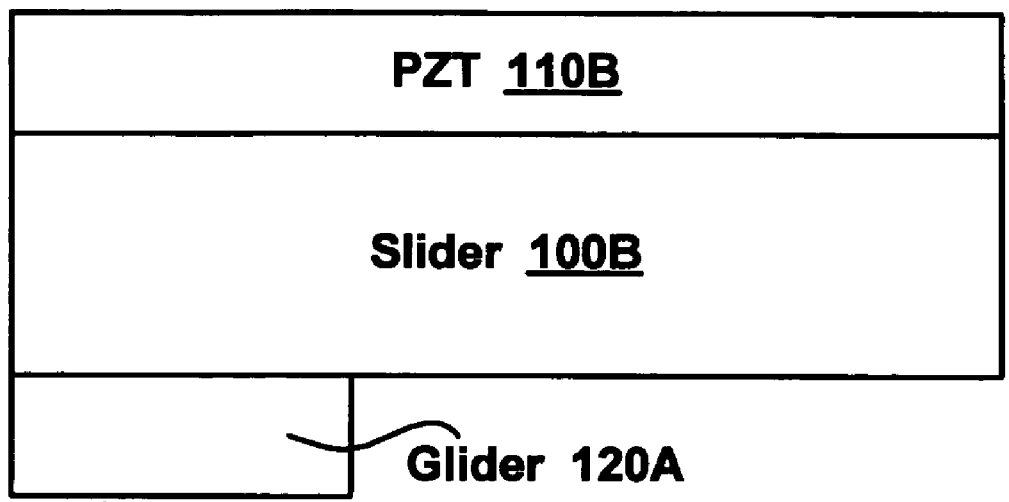

Referring to FIG. 1A, an asperity detector 110A and a glider 120A are associated with slider 100A. According to one embodiment, a piezo sensor 110B (PZT) is used as an asperity detector. Referring to FIG. 1B, a PZT 110B and a glider 120A are associated with slider 100B.

Figure 1C:
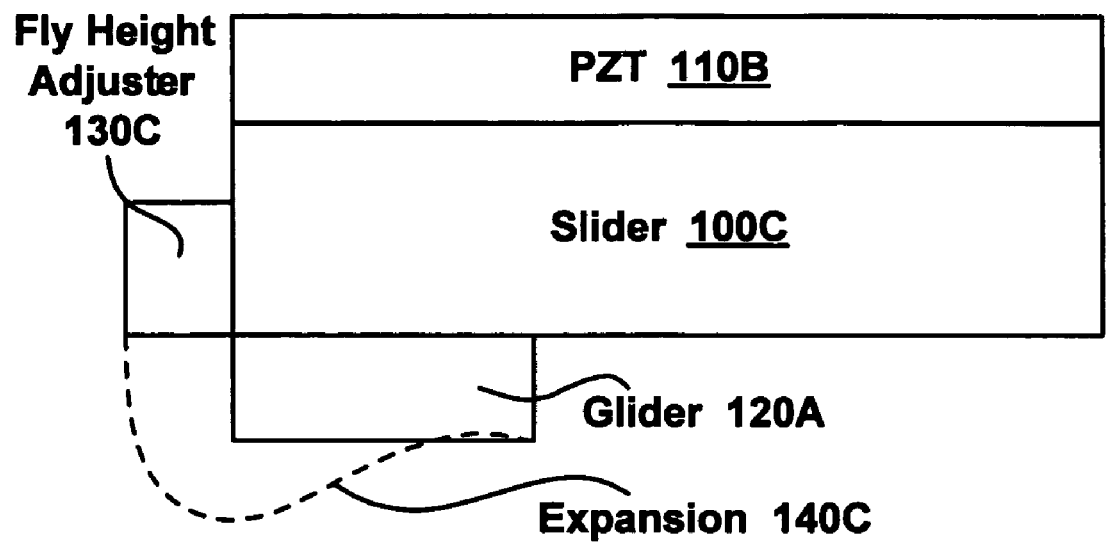

Referring to FIG. 1C, a fly height adjuster 130C is associated with a slider 100C, according to another embodiment. A fly height adjuster 130C can adjust the fly height of the slider 100C, for example, by causing the material associated with the slider 100C to expand resulting in expansion 140C as depicted in FIG. 1C.

Figure 1D:
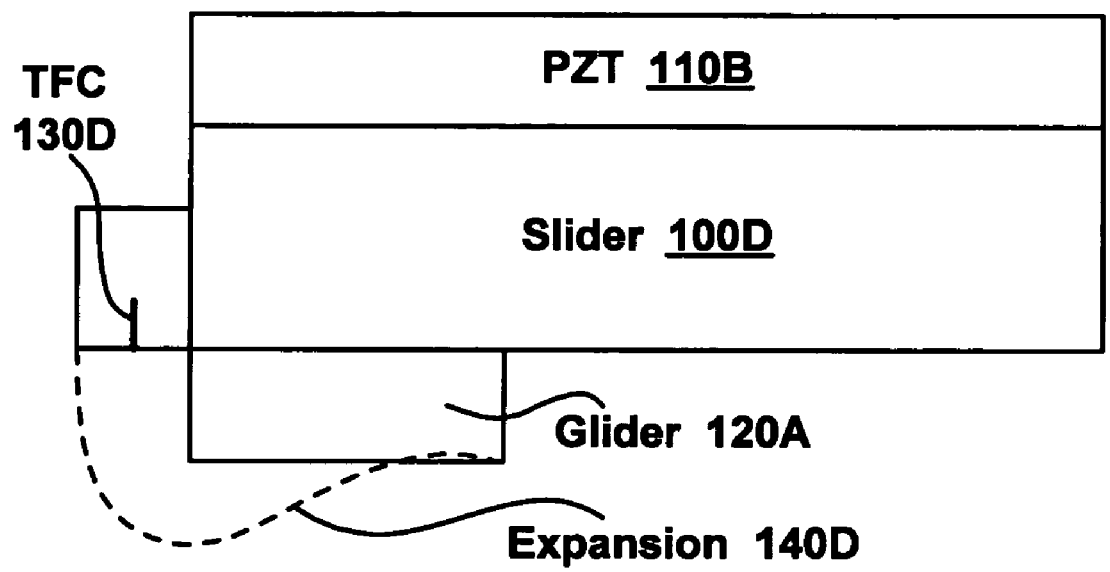

According to yet another embodiment, a Thermal Fly Height Control Implement (TFC) is used as a fly height adjuster. FIG. 1D depicts a slider 100D that uses a TFC 130D as a fly height adjuster. The temperature of the TFC 130D can be varied. As the temperature of the TFC 130D rises, the expansion 140D will grow, thus lowering the fly height. As the temperature of the TFC 130D lowers, the expansion 140C will retract, thus increasing the fly height.

Figure 2B:
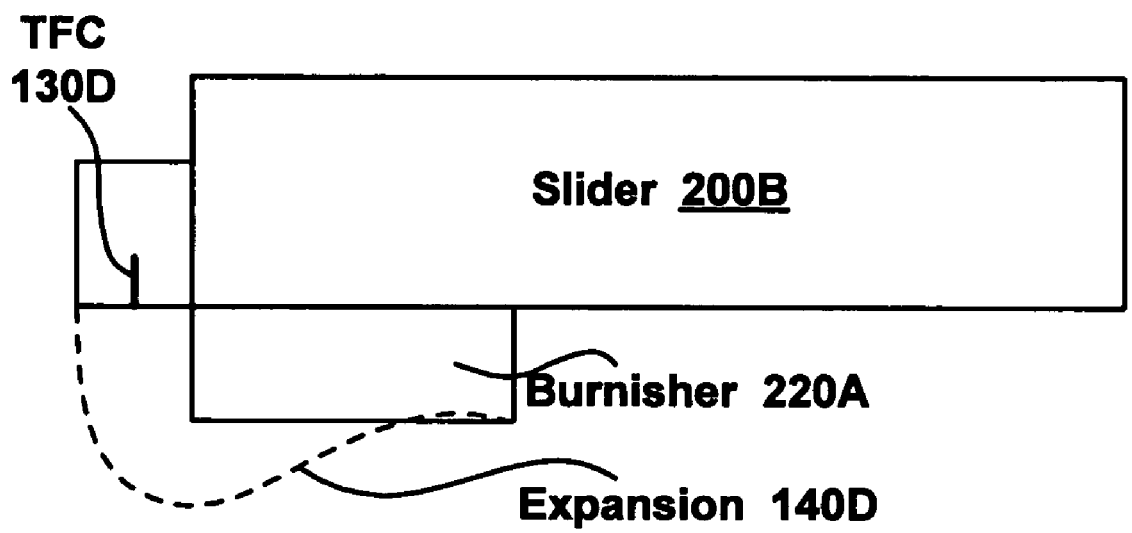

According to still another embodiment, a fly height adjuster and a burnisher are associated with a slider. A burnisher is made of material that is hard or rough, or both hard and rough, as is well known in the art. FIGS. 2A and 2B depict sliders that have a fly height adjuster and a burnisher, according to various embodiments of the present invention. For example, a burnisher 220A and a fly height adjuster 130C are associated with slider 200A. The fly height adjuster 130C can adjust the fly height of slider 200A, for example, by causing an expansion 140C as already described herein.

According to other embodiments, the fly height of a slider 100A-100D, 200A, 200B, 300 can be adjusted by applying a voltage to a PZT that is associated with a slider, by using air pressure, by applying a voltage between the head and the disk, or by applying a downward mechanical force to the top of the slider.

A burnisher 200B and a TFC 130D are associated with slider 200B. A TFC 130D can be used as a fly height adjuster, as already described herein.

Figure 3:
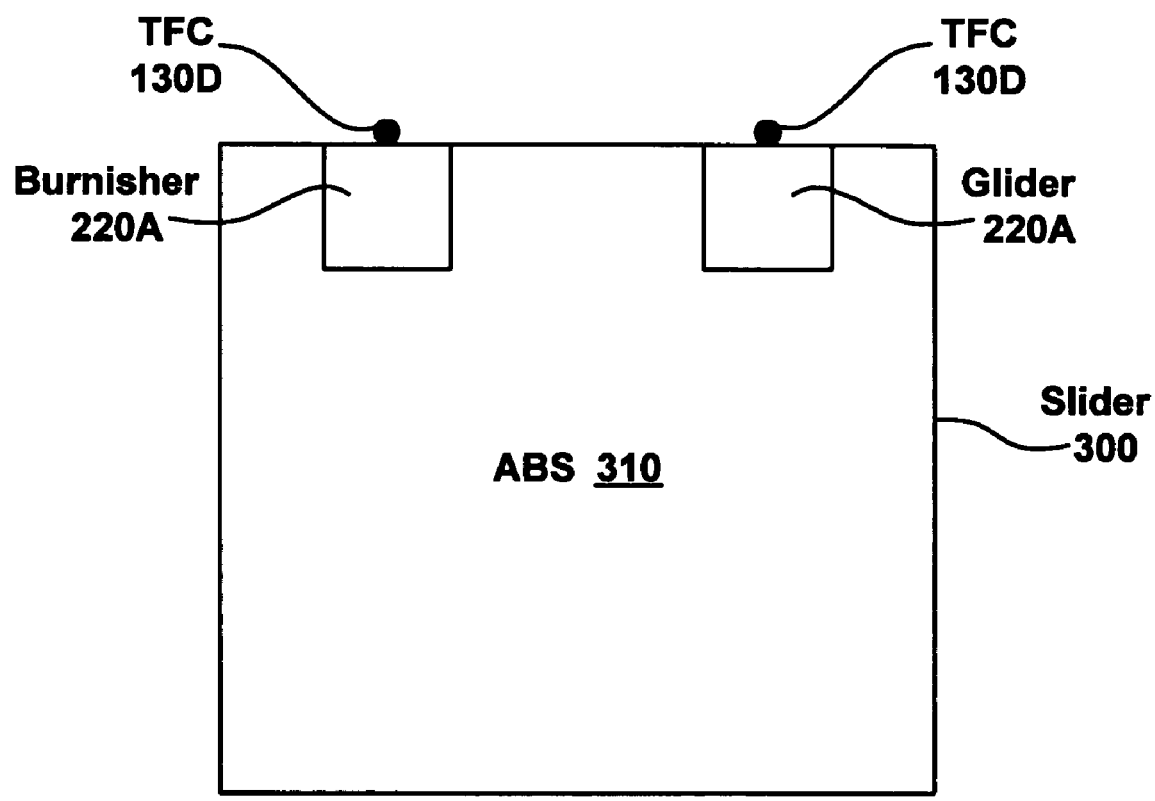
FIG. 3 depicts a slider that both enables location specific burnishing of a disk and that performs location specific burnishing of the disk, according to various embodiments of the present invention.

FIG. 3 depicts a slider that both enables location specific burnishing of a disk and that performs location specific burnishing of the disk, according to various embodiments of the present invention. Slider 300 is depicted from a bottom view, thus, showing the air bearing surface 310 (ABS). Slider 300 has a glider 120A and an associated TFC 130D that enable location specific burnishing. The slider 300 also has a burnisher 220A and an associated TFC 130D for performing location specific burnishing. The slider 300 may also have an asperity detector (not shown), such as asperity detector 110A or PZT 110B. The slider 200 can also have a fly height adjuster (not shown), such as a TFC.

Sliders 200A, 200B, 300 can have more than one burnisher 220A.

THE LOCATION OF AN ASPERITY

Figure 4:
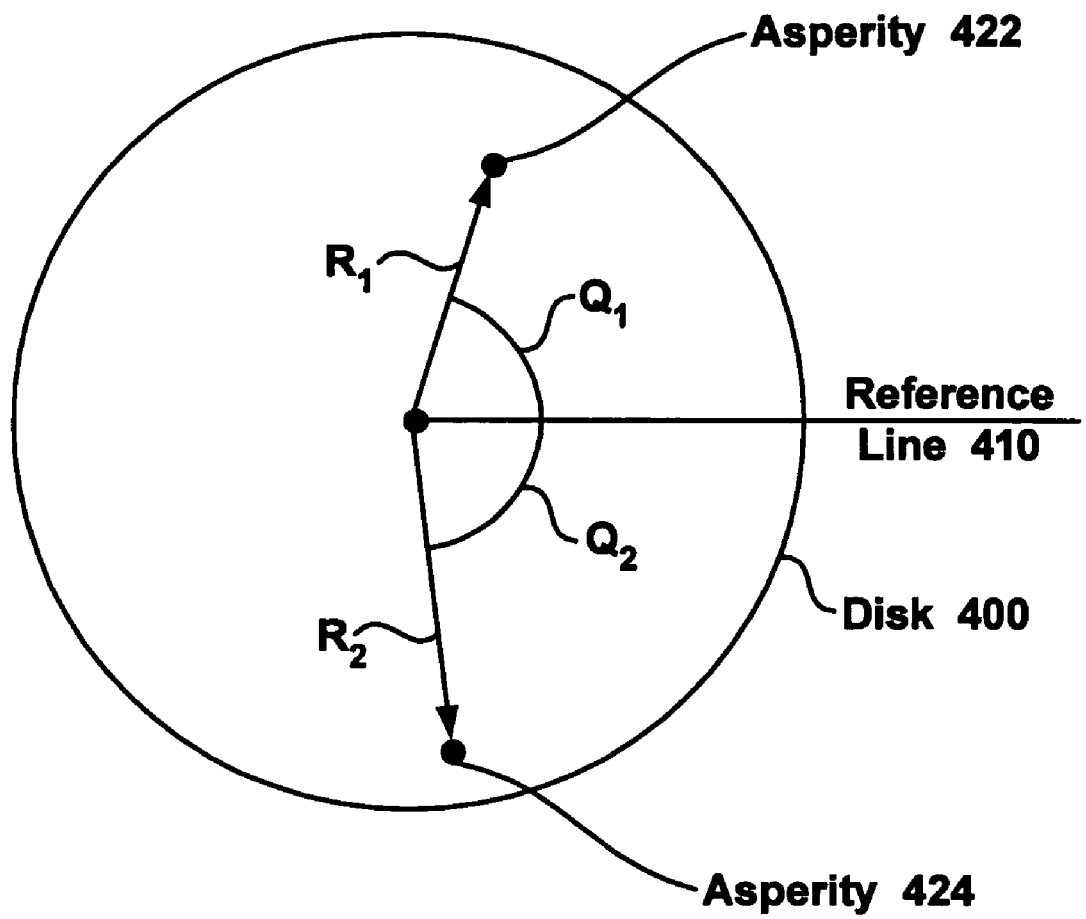
FIG. 4 depicts a top view of a disk with locations depicted for two asperities, according to various embodiments of the present invention.

The location of an asperity, according to one embodiment, is specified in terms of a radius and an angle with respect to a reference on the disk. FIG. 4 depicts a top view of a disk with locations depicted for two asperities, according to various embodiments of the present invention. For example, the disk depicts asperities 422, 424. The location of the asperities 422, 424 are specified using angles $\Theta 1$, $\Theta 2$ with respect to a reference line 410 and radiuses R1, R2. More specifically, the location of asperity 422 is specified using radius R1 and angle $\Theta 1$. Further, the location of asperity 424 is specified using radius R2 and angle $\Theta 2$.

ADJUSTING THE FLY HEIGHT FOR THE PURPOSE OF DETERMINING THE POSITION OF AN ASPERITY

Figure 5:
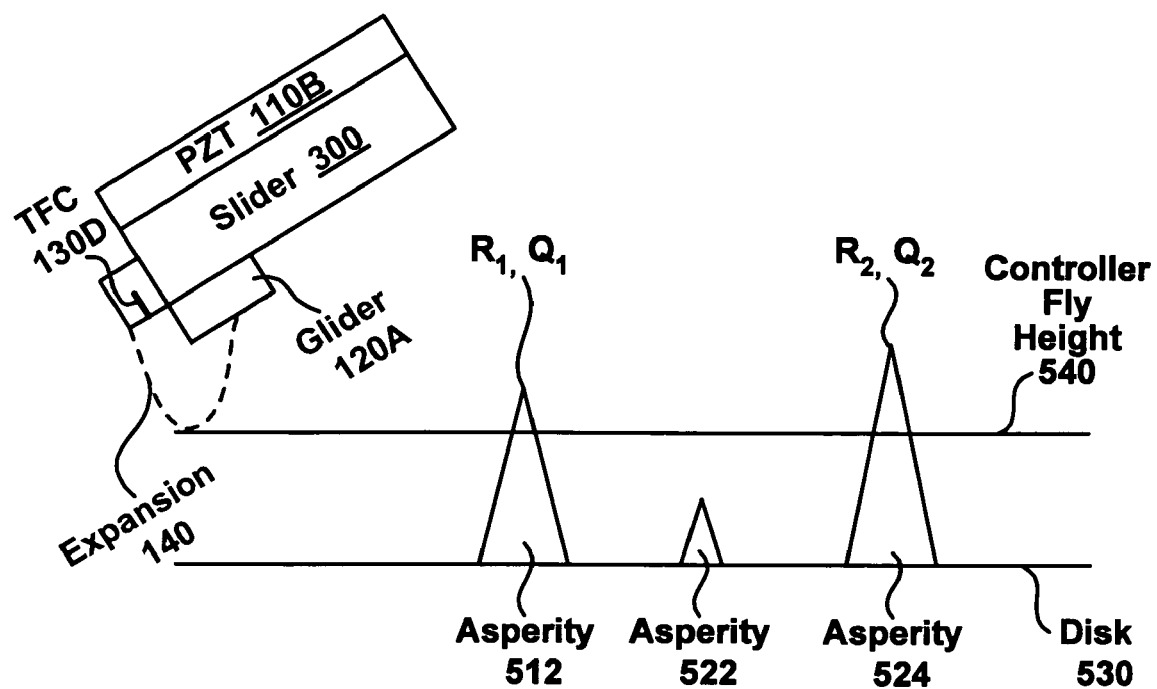
FIG. 5 depicts a slider that enables location specific burnishing, according to various embodiments of the present invention.

A slider with a known fly height can be used for determining the location of asperities on the surface of a disk. FIG. 5 depicts a slider that enables location specific burnishing, according to various embodiments of the present invention. FIG. 5 depicts a slider 300, a disk 530, asperities 512, 522, 524 on the surface of disk 530, and a controlled fly height 540. The slider 300 can be used for evaluating the smoothness of the disk 530 by causing locations of asperities to be stored, thus, enabling location specific burnishing, for example.

A known fly height of a slider 300 can range from 6 nanometers (nms) to 12 nms. A preferred known fly height is 10 nms. A fly height adjuster, such as TFC 130D, can adjust the fly height of a slider 300 to what is known as a controlled fly height 540. The controlled fly height 540 can range from 2 nms to 10 nms. A preferred controlled fly height 540 is 5 nms. As the slider 300 glides at the controlled fly height, the slider 300 will come into contact with asperities 512, 524 that stick up above the controlled fly height 530. Asperity 522 does not stick up above the controlled fly height 530 so slider 300 will not come into contact with asperity 522. When the slider 300 comes into contact with an asperity 512, 524, the asperity detector, e.g., PZT 110D, can detect the presence of the asperity 512, 524 and the location (e.g., R1, $\Theta 1$ for asperity 512 and R2, $\Theta 2$ for asperity 524) of the asperity 512, 524 can be stored. Note that the power for adjusting the TFC 130D is relatively at a constant level 560 resulting in the slider 300 gliding at a relatively constant controlled fly height 540.

Although FIG. 5 depicts slider 300, sliders 100A, 100B, 100C, 100D can also be used for determining the location of asperities on a disk.

ADJUSTING THE FLY HEIGHT FOR THE PURPOSE OF PERFORMING LOCATION SPECIFIC BURNISHING

Figure 6:
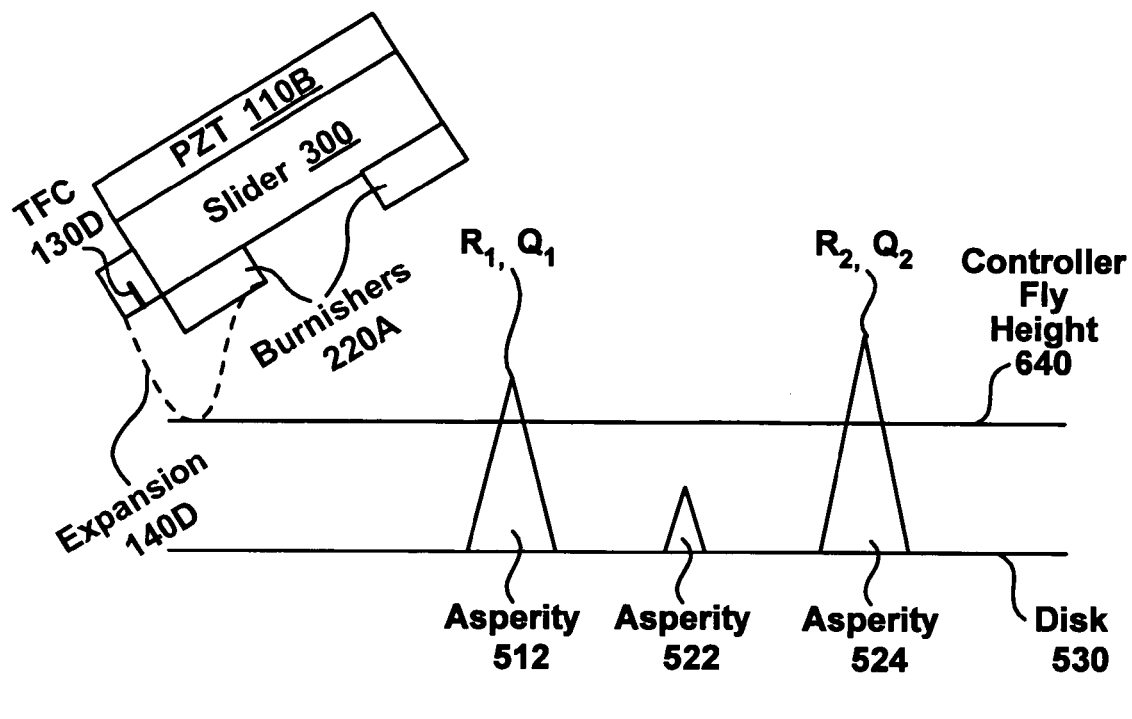
FIG. 6 depicts a slider that can be used for the purpose of burnishing asperities using location specific burnishing, according to various embodiments of the present invention.

In the case of a slider that has a burnisher, the fly height of a slider can be adjusted for the purpose of burnishing asperities using location specific burnishing. FIG. 6 depicts a slider that can be used for the purpose of burnishing asperities using location specific burnishing, according to various embodiments of the present invention.

FIG. 6 depicts a slider 300, a disk 530, asperities 512, 522, 524 on the surface of disk 530, and a controlled fly height 640. The controlled fly height 640 can have the same range and preferred fly height as controlled fly height 540. Further, the slider 300 as depicted in FIG. 6 also has a known fly height that is the same as the known fly height of slider 300 depicted in FIG. 5. Assume for the purposes of illustration, that the slider 300 depicted in FIG. 6 has a known fly height of 10 nms and a controlled fly height 640 of 5 nms.

The locations of the asperities 512, 524 that are below the controlled fly height 640 are used to perform location specific burnishing on the asperities 512, 524. The fly height adjuster, TFC 130D, is off as the slider 300 glides over the areas of the disk 530 that do not have asperities. Thus, the slider 300 glides at its known fly height of 10 nms. More specifically, the fly height adjuster is turned off from time T1 to T2, from time T3 to T4 and from T5 to T6.

The fly height adjuster, TFC 130D, is turned on when the slider is in the vicinity of an asperity 512, 514. For example, the fly height adjuster, TFC 130D, is turned on to a level that causes the slider 300 to fly at the critical fly height 640 as it 300 approaches an asperity 512, 524. Thus, the slider 300 glides at its 300 controlled fly height 640 of 5 nms at the time T2, T4 that it 300 approaches an asperity 512, 524 until the time T4, T5 that it 300 passes the asperity 512, 524.

FLY HEIGHTS

As already stated, the known fly height of a slider can range from 6 nanometers (nms) to 12 nms. A preferred known fly height is 10 nms. A fly height adjuster, such as a TFC, can adjust the fly height of a slider to what is known as a controlled fly height. The controlled fly height can range from 2 nms to 10 nms. A preferred controlled fly height is 5 nms.

In certain types of disk drives, a slider is loaded onto and unloaded off of a ramp that is at the outer diameter (OD) of the disk.

A COMPUTER SYSTEM THAT CONTROLS LOCATION SPECIFIC BURNISHING

Figure 7:
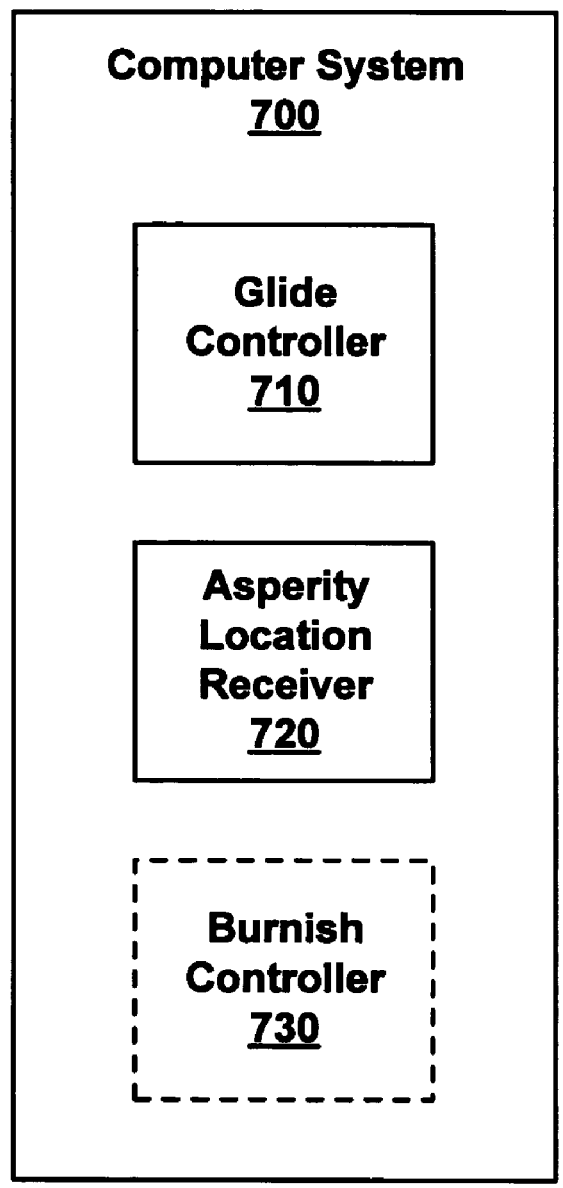
FIG. 7 depicts a computer system that controls location specific burnishing, according to one embodiment of the present invention.

FIG. 7 depicts a computer system that controls location specific burnishing, according to one embodiment of the present invention. FIG. 6 depicts a computer system 700 that includes a glide controller 710, an asperity location receiver 720, and an optional burnish controller 730. The glide controller 710 controls how a slider 100A, 100B, 100C, 100D, 300 glides over a disk 400, 530 to determine if there is an asperity on the disk 400, 530. An asperity location receiver 720 receives a location, such as R1, Θ1 or R1, Θ1, of an asperity 512, 524 on the disk 400, 530. For example, the asperity location receiver 720 can receive an electrical signal generated by an asperity detector 110A, 110B when a slider and use the electrical signal to determine the location of an asperity 512, 524. The burnisher controller 730 causes a burnisher 220A to perform location specific burnishing on an asperity 512, 524, as described herein.

OPERATIONAL EXAMPLES

Figure 8:
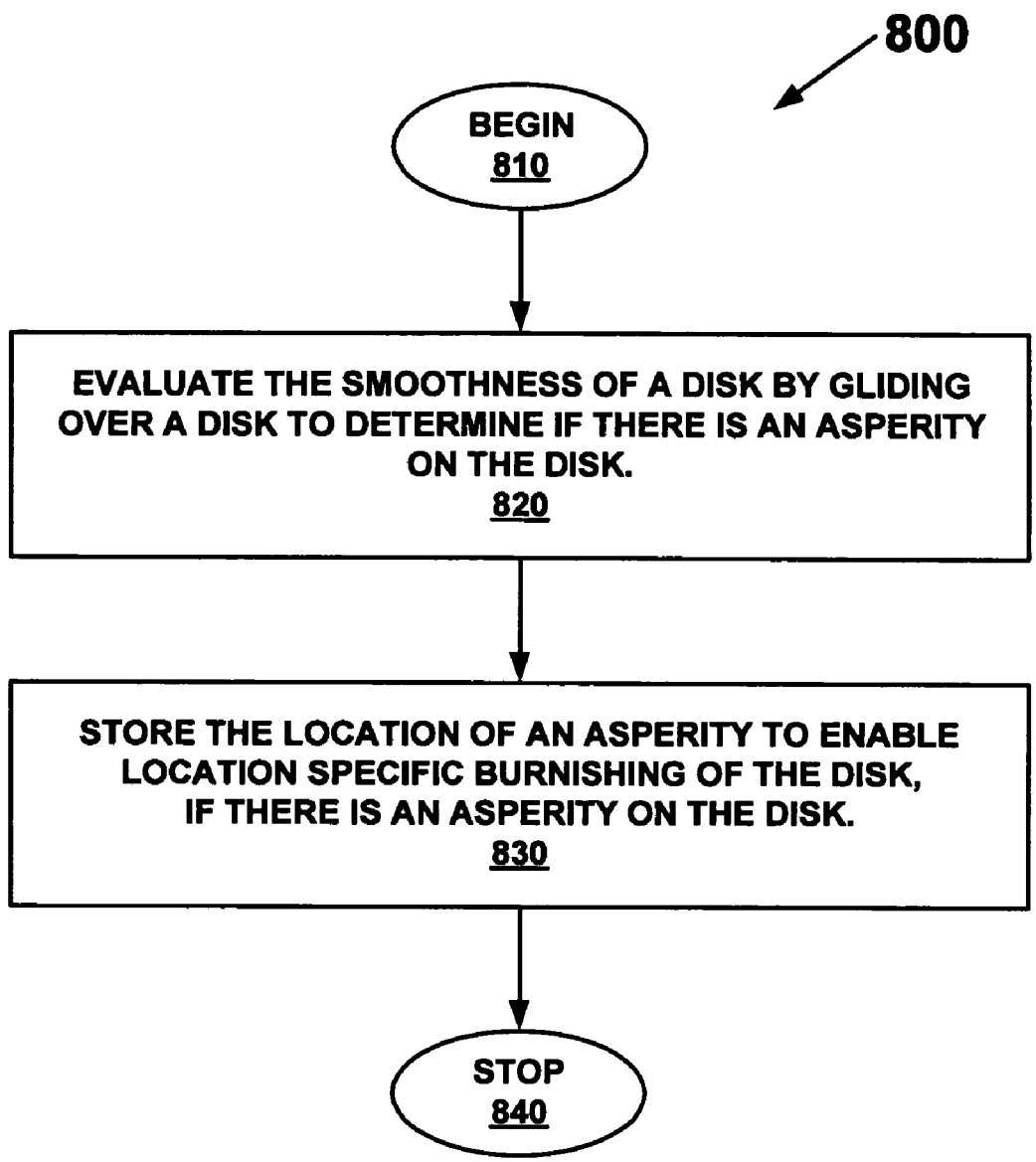
FIG. 8 depicts a flowchart 800 for a method of enabling location specific burnishing of a disk, according to one embodiment of the present invention.
Figure 9:
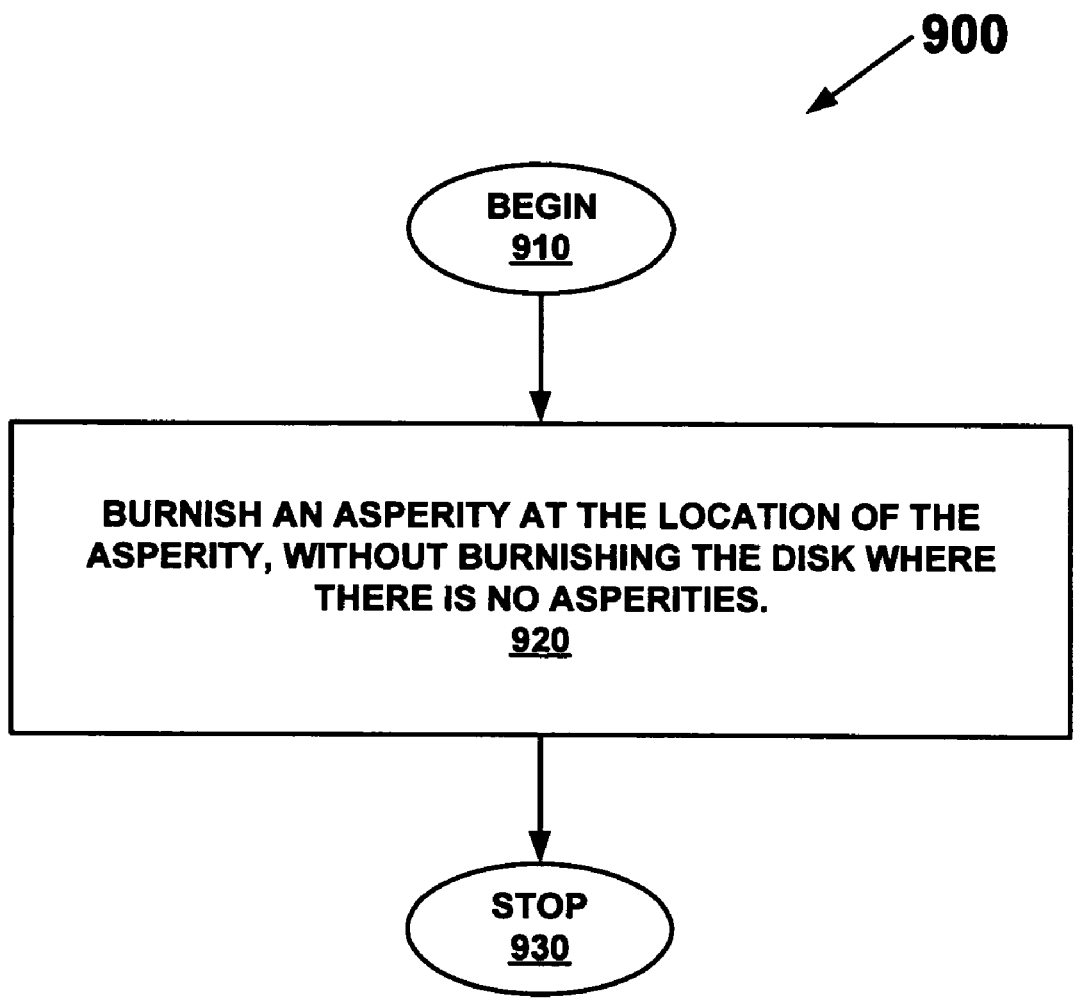
FIG. 9 depicts a flowchart 900 for a method of performing location specific burnishing of a disk, according to another embodiment of the present invention The drawings referred to in this description should not be understood as being drawn to scale except if specifically noted.

FIG. 8 depicts a flowchart 800 for a method of enabling location specific burnishing of a disk, according to one embodiment of the present invention. FIG. 9 depicts a flowchart 900 for a method of performing location specific burnishing of a disk, according to another embodiment of the present invention. Although specific steps are disclosed in flowcharts 800, 900, such steps are exemplary. That is, embodiments of the present invention are well suited to performing various other steps or variations of the steps recited in flowcharts 800, 900. It is appreciated that the steps in flowcharts 800, 900 may be performed in an order different than presented, and that not all of the steps in flowchart 800, 900 may be performed.

According to one embodiment, the entire surface of the disk is burnished and then the method illustrated by flowchart 800 is performed.

In step 810, the process begins.

In step 820, the smoothness of a disk is evaluated by gliding over a disk to determine if there is an asperity on the disk. For example, the glide controller 710 controls how a slider 100A-100D, 300 glides over a disk 530, for example, to determine if there is an asperity 512, 524 on the disk. The glide controller 710, according to one embodiment, controls a fly height adjuster, thus, controlling how the slider glides over the disk. For example, in the case of a fly height adjuster that is a TFC 130D, the glide controller 710 can turn the TFC power on, thus causing an expansion. The amount of expansion can be controlled by the amount of TFC power applied to the TFC 130D. For example, the larger the expansion is, the lower the fly height will be. In this case of a slider 100A, 100B, 100C, 100D, 300 that enables location specific burnishing of a disk, the glide controller 710 can always have the TFC power on at approximately a level 560 that causes the slider to fly approximately at a controlled fly height 540.

In step 830, the location of an asperity is stored to enable location specific burnishing of the disk, if there is an asperity on the disk. For example, the asperity location receiver 720 can receive the electrical signals that an asperity detector 110A, such as a PZT 110B, generates when the slider encounters an asperity 512, 524. The asperity location receiver 720 can use the electrical signal to determine the location, such as R1, Θ1 or R2, Θ2 of an asperity 512, 524 and store the location. The stored location can then be used by a slider 200A, 200B, 300 that performs location specific burnishing of a disk 530.

In step 840, the process stops.

According to one embodiment, steps 820 and 830 are performed in preparation for the method illustrated by flowchart 900.

In step 910, the process beings.

Step 920, an asperity is burnished at the location of the asperity, without burnishing the disk where there are no asperities. In the case of a slider 200A, 200B, 300 that performs location specific burnishing of a disk 530, the burnish controller 730 can adjust the TFC power so that the slider 200A, 200B, 300 glides at approximately a known fly height, such as 10 nms, where there are no asperities. Further, the burnish controller 730 can adjust the TFC power so that the slider glides at approximately a controlled fly height 640, such as 5 nms, while the slider is in the vicinity of an asperity 512, 524, as described herein.

In step 930, the process stops.

In one embodiment, the methods illustrated by flowcharts 800 and 900 are repeated until the surface of the disk passes a specified level of smoothness.

According to one embodiment, if subsequent evaluations (e.g., as illustrated by flowchart 800) determine that there are still asperities after the disk as been evaluated and burnished (e.g., as illustrated by flowchart 900) once, then burnishing is performed for a longer time or using a higher voltage to cause a slider with a burnisher to fly closer to the disk, thus, burnishing more asperities.

According to one embodiment, the evaluating as illustrated by flowchart 800 and the burnishing as illustrated by flowchart 900 are performed on one side of a disk at a time.

For example, a slider 100A, 100B, 100C, 100D and another slider 200A 200B could be used to evaluate and burnish one side of a disk. Alternative, a slider 300 could be used to evaluate and burnish one side of the disk. According to another embodiment, the evaluating and the burnishing are performed on both sides of a disk simultaneously. For example, two sliders 100A, 100B, 100C, 100D could be used to evaluate the two sides of a disk and two sliders 200A 200B could be used to burnish the two sides of the disk. Alternatively, two sliders 300A can be used to evaluate and burnish the two sides of the disk.

What is claimed is:

1. A method of enabling location specific burnishing of a disk, the method comprising:
   evaluating the smoothness of a disk by causing a slider to glide over a disk to determine an asperity on the disk; and
   storing a location of the asperity to enable location specific burnishing of the disk; and
   causing the slider to glide over the entire disk, wherein the slider glides at a known fly height in locations where there are no asperities and the slider is lowered to a controlled fly height in proximity of the location of the asperity whereby location specific burnishing of the disk is performed.

2. The method as recited in claim 1, further comprising:
   burnishing the disk at the location of the asperity; and
   not burnishing the disk where there are no asperities.

3. The method as recited in claim 2, further comprising:
   repeating the evaluating, the storing of the location and the burnishing until the surface of the disk passes a specified level of smoothness.

4. A slider that enables location specific burnishing of a disk, the slider comprising:
   a glider for gliding over a disk to determine an asperity on the disk; and
   an asperity detector that causes a location of the asperity to be stored, a fly height adjuster for adjusting a fly height of a slider based on a location of an asperity on the disk, whereby location specific burnishing of the disk is enabled, wherein the fly height adjuster causes the slider to glide over the entire disk at a known fly height in locations where there are no asperities and the slider is lowered by said fly height adjuster to a controlled fly height in proximity of the location of the asperity whereby location specific burnishing of the disk is performed.

5. The slider of claim 4, further comprising:
   a burnisher for performing location specific burnishing of the disk based on the location of the asperity.

6. The slider of claim 5, wherein a computer system controls the slider and wherein the computer system comprises:
   a glide controller for controlling how the slider glides over the disk to determine if there is an asperity on the disk; and
   an asperity location receiver that receives the location of an asperity on the disk.

7. The slider of claim 6, wherein the computer system further comprises:
   a burnisher controller that causes the burnisher to burnish the disk at the location of the asperity and causes the burnisher to not burnish the disk where there are no asperities.

8. The slider of claim 4, further comprising:
   an asperity detector for detecting the asperity.

9. The slider of claim 8, wherein the asperity detector is a Piezo sensor (PZT).

10. The slider of claim 4, wherein the known fly height ranges from 6 nanometers (nms) to 12 nms.

11. The slider of claim 10, wherein a preferred known fly height is 10 nms.

12. The slider of claim 4, further comprising:
    a fly height adjuster that adjusts the fly height of the slider.

13. The slider of claim 12, wherein the fly height adjuster adjusts the fly height of the slider to the controlled fly height that ranges from 2 nms to 10 nms.

14. The slider of claim 13, wherein a preferred controlled fly height is 5 nms.

15. The slider of claim 12, wherein the fly height adjuster is a Thermal Fly Height Control (TFC).

16. The slider of claim 15, wherein the TFC is located where a conventional read sensor would be.

17. The slider of claim 12, wherein the fly height can be adjusted using a technique selected from a group consisting of using air pressure, by applying a voltage between the head and the disk, or by applying a downward mechanical force to the top of the slider.

18. A slider that performs location specific burnishing of a disk, the slider comprising:
    a glider for gliding over the disk to determine an asperity on the disk;
    an asperity detector for storing a location of the asperity;
    a fly height adjuster for adjusting a fly height of a slider based on a location of an asperity on a disk;
    a burnisher for burnishing the disk at the location of the asperity, without burnishing the disk where there is no asperities; and wherein the fly height adjuster causes the slider to glide over the entire disk, wherein the slider glides at a known fly height in locations where there are no asperities and the slider is lowered by said fly height adjuster to a controlled fly height in Proximity of the location of the asperity whereby location specific burnishing of the disk is performed.

19. The slider of claim 18, wherein the fly height adjuster adjusts the fly height of the slider to the known fly height when the slider is not in the vicinity of the asperity and the fly height adjuster adjusts the fly height of the slider to the controlled fly height when the slider is in the vicinity of the asperity.

20. The slider of claim 19, wherein the controlled fly height ranges from 2 nms to 10 nms.

* * * * *